Nov. 27, 1934.  W. ANDERSON  1,982,189
VALVE
Filed Aug. 21, 1929
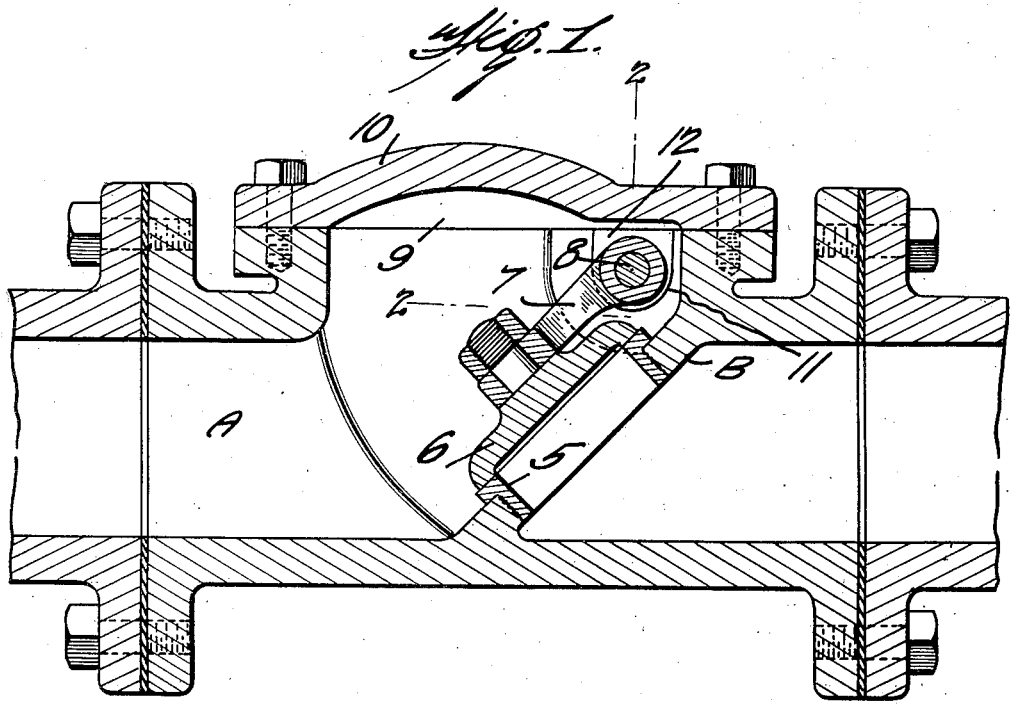
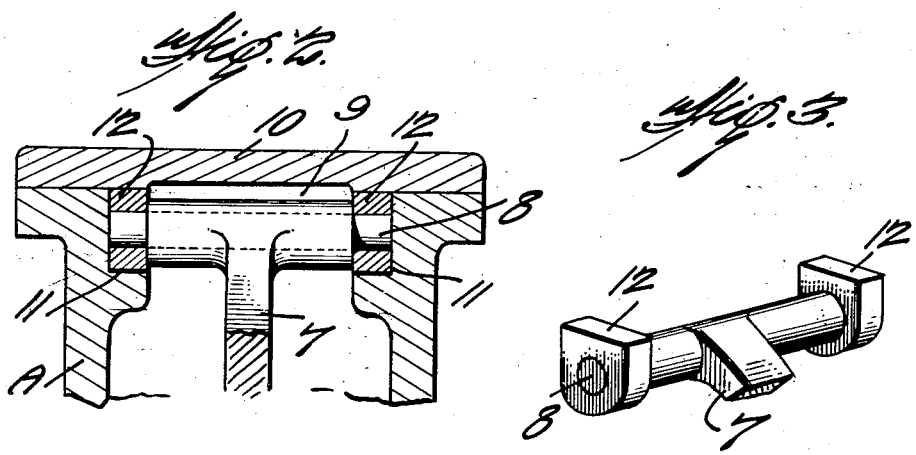
Inventor
William Anderson.
By James E. Sproll.
Attorney.

Patented Nov. 27, 1934

1,982,189

UNITED STATES PATENT OFFICE 1,982,189

VALVE

William Anderson, Seattle, Wash.

Application August 21, 1929, Serial No. 387,390

2 Claims. (Cl. 251—123)

The invention relates to a valve hanger and bearings therefor, and more especially to replaceable bearings for swinging valves.

The primary object of the invention is the provision of bearings of the kind named, wherein the pivot for a swinging valve can be readily journalled in said bearings so that when the valve is placed in position for working within a pipe of the type employed for conducting fluids containing acids, and when the latter by reason of their corrosive action corrode and deteriorate such bearings, new bearings can be conveniently substituted with dispatch for the replacement of the defective bearings.

Another object of the invention is the provision of bearings of this character, wherein the pipe or other part for the valve is so constructed as to provide pockets corresponding to the style of the bearings, and in this fashion the latter can be detachably held within the pipe or other part for replacement, should the original bearings become defective, the bearings being designed to carry the pivot for swingingly supporting a valve.

A further object of the invention is the provision of bearings of this character, wherein the make up of the same and their mountings within a pipe or other part is novel in form, and assure replacement of such bearings at any time without requiring disassembling of the valve and its hanger or support, the bearings being accessible from without the pipe or other part, and no special tools being required for replacement of said bearings.

A still further object of the invention is the provision of bearings of the character named, which are extremely simple in construction, thoroughly reliable and efficient in purpose, strong, durable, and inexpensive to manufacture and install.

With these and other objects in view, the invention consists in the features of construction, combination and arrangement of parts as will be hereinafter more fully described, illustrated in the accompanying drawing, showing the preferred embodiment of the invention, and pointed out in the claims hereunto appended.

In the accompanying drawing:

Figure 1 is a fragmentary vertical longitudinal sectional view through a fluid pipe showing the valve mounted therein and the replaceable bearings constructed in accordance with the invention.

Figure 2 is a sectional view taken approximately on the line 2—2 of Figure 1.

Figure 3 is a perspective view of a portion of the hanger for the valve showing the pivot thereof engaged in the bearings, these being removed from the pipe.

Similar reference characters indicate corresponding parts throughout the several views in the drawing.

Referring to the drawing in detail, A, designates generally a portion of a sectional pipe for conducting fluids containing acids such as are employed in pulp mills, and formed in this pipe section is an angularly disposed partition B, provided with an opening in which is fitted a valve seat 5, the latter being of conventional form, while against this seat plays a valve 6, which in this instance is of inverted substantially saucer shape formation, although it may be of flat disk-like type, the valve and seat being no part of the present invention.

The valve 6 is detachably connected with a swinging arm 7, forming a hanger therefor, which latter is provided with a cross pivot 8, either integral therewith or separate therefrom, and is adapted to be journalled within the pipe for the mounting of the valve in working position.

The pipe A, directly above the point of location of the valve 6 therein, is provided with an entrance opening 9, closed by means of a fluid-tight cover 10, removably secured in place in any desirable manner.

In diametrically opposed relation and formed in the walls of the opening 9, at the proper point of location of the pivot 8, are recesses or pockets 11, for accommodating removable bearings 12, the pockets opening upwardly and being correspondingly shaped to the bearing, so that the latter can be removed for replacement or substitution, should the original bearings become defective.

The bearings 12 have journalled therein the pivot 8, and on removal of said bearings from the pockets 11, the valve 6, and hanger 7, are extracted as a unit through the entrance opening 9, so that on inspection of said bearings 12, it appears that the same have become severely corroded or worn, then new bearings can be substituted for the defective ones, as will be clearly apparent.

In pulp mills it has been found that the acids contained in the fluids employed in the manufacture of paper pulp are extremely detrimental to the bearings of valves located within the pipes conveying such fluids, so it has been found necessary to construct replaceable bearings, as delineated herein, thus effecting a great saving in expense and time to operators of such plants.

What is claimed is:

1. The combination with a casing for a non-return valve having accessible pockets formed within its side walls adjacent its upper end, of a bearing removably seated within each of said pockets with its upper end flush with the upper face of said valve casing and being adapted to carry a pivot for a swinging hanger for the valve, said pivot being wholly enclosed within said valve casing and having its terminals removably journalled within said bearings substantially in flush relation with the outer faces thereof, and a cover for said casing adapted to maintain said bearings in seated relation within said pockets.

2. The combination with a non-return valve casing provided with a valve seat partition and an entrance opening above the seat having upwardly opening opposed pockets formed within its side walls, of a swinging valve cooperating with said seat, a pivotal hanger for the valve, a bearing for the pivotal hanger removably seated in each of said pockets with its upper end flush with the upper end of said entrance opening, the pivot of said pivotal hanger being wholly enclosed within said valve casing and having its terminals removably journalled within its bearings substantially in flush relation to the outer faces thereof, and a cover for said entrance opening adapted to maintain said bearings in seated relation within said pockets.

WILLIAM ANDERSON.